April 24, 1934.  W. DZUS  1,955,740

FASTENING DEVICE

Original Filed Sept. 15, 1931

WITNESS:
Chris Feinle.

INVENTOR
William Dzus.
BY Munn & Co.
ATTORNEYS.

Patented Apr. 24, 1934

1,955,740

UNITED STATES PATENT OFFICE

1,955,740

FASTENING DEVICE

William Dzus, West Islip, N. Y.

Refiled for abandoned application Serial No. 562,973, September 15, 1931. This application June 21, 1933, Serial No. 676,975

8 Claims. (Cl. 24—221)

The invention relates to a fastening device designed and adapted for detachably fastening together separate parts or appurtenances. The device is well suited for fastening together parts of an aircraft cowling or other parts, the fastening of automobile license plates to their brackets and the effecting of fastenings for many other purposes.

An object of the invention is the provision of a device of the indicated character which forms a quick detachable fastening or securing means enabling the quick and easy fastening of one part to another, and the detaching or separating of the same therefrom.

With the foregoing and other objects in view, the invention resides in the combinations, constructions and functions of the parts hereinafter fully described and illustrated in the accompanying drawing, in which Figure 1 shows a fastening device of the invention in use;

Figure 1:
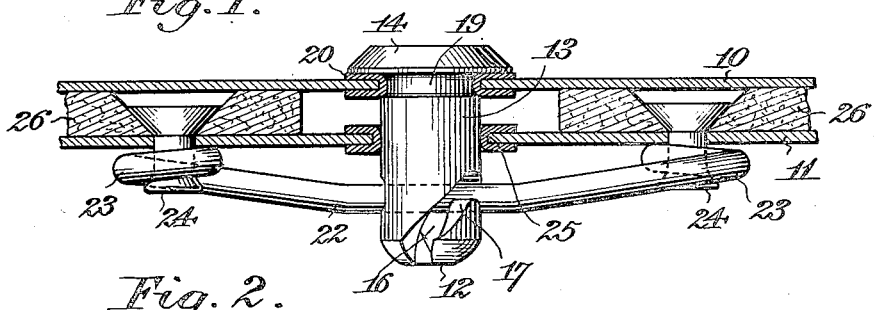
Figure 2:
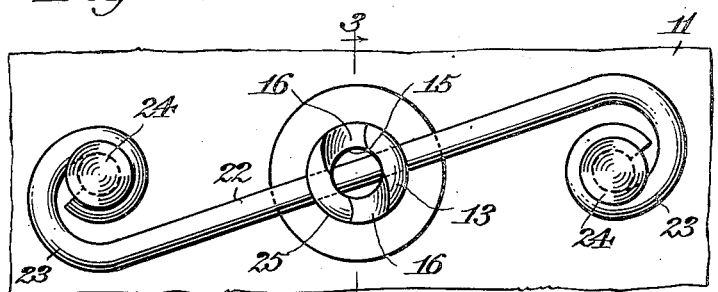
Figure 2 is a side view.
Figure 3:
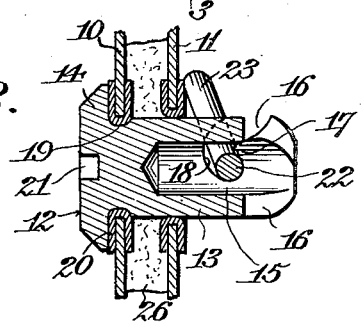
Figure 3 is a section on the line 3—3 of Figure 2.
Figure 4:
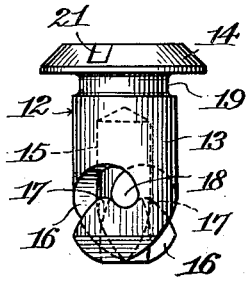
Figure 4 is a side view of the button of the device.

In the drawing, by way of example, there are shown separate parts or plates 10 and 11 of an aircraft cowling which are fastened together by the device of the present invention.

The device includes a fastening element 12 in the form of a button consisting of a shank 13 having a head 14 on one end. The shank 13 has a bore 15 extending longitudinally thereof and opening through the end opposite that having the head 14. It will therefore be apparent that the shank 13 is of tubular construction. The shank 13 has bayonet slots opposite each other in the wall thereof positioned to receive a cooperative fastening element.

The entrance branch 16 of each slot opens through the end of the shank opposite that having the head, the said branch being spiral with respect to the axis of the shank. One wall of the slot has a projection 17 forming a continuation of said wall for a purpose to appear hereinafter. The slots provide holes or apertures 18 which communicate respectively with the branches 16, and said holes or apertures extend transversely of the shank 13 in alinement with each other. The shank 13 has an annular groove 19 therein directly beneath the head 14. The element 12 is fastened to the plate 10 in such a manner that it may be turned or rotated while being held against axial movement. In other words, the element 12 is swivelly connected with the plate 10. The element 12 may be connected with the plate 10 in the manner stated by any suitable means employed in connection with the groove 19, and, in the present instance, this result is obtained by the use of a grommet 20 positioned in an opening in the plate 10. As the grommet 20 is fastened to the plate 10, the annular portion thereof will be extended into the groove 19 in the fastening operation. It is to be understood that the element 12 may be swivelly connected with the plate 10 by extending the material thereof into the groove 19. The head 14 of the element 12 has a kerf 21 to accommodate a suitable tool for the purpose of turning or rotating the element 12. The device also includes a suitable connector 22, made preferably of resilient material such as wire, or any other material having the necessary resiliency to constitute resilient means or a spring. In the present instance connector 22 is made of a single piece of stout wire having a spring coil at one or both ends thereof by virtue of which the connector is resilient and by which it may be secured for the intended purposes, there being a coil 23 at each end in the present instance. The connector 22 is secured in place on the plate 11 by suitable fasteners 24 carried by the plate 11 and received respectively in the terminal convolutions of the coils 23. The intermediate section of the connector 22 is bowed or arched and extends transversely of a hole 25 in the plate 11.

From the foregoing it will be apparent that the parts 10 and 11 may be quickly and easily fastened together by bringing the plate 10 beside the plate 11 and entering the shank 13 of the element 12 in the hole 25. The element 12 is turned to a position in which the entrance branches 16 of the slots will receive the intermediate section of the connector 22. By the use of a suitable tool, such as a screw driver, entered in the kerf 21 the element 12 may be forcefully turned causing the intermediate section of the connector 22 to be drawn from its normal position into the holes or apertures 18 past the projections 17. In accomplishing this result the walls of the slot branches 16 function as cams. When the element 12 is engaged with the connector 22 in the manner explained, the plates 10 and 11 will be securely fastened together. The projection 17 will resist retrograde rotation of the element 12 and thus prevent unintentional separation of the plates 10 and 11. In the present instance, strips or pieces of felt or other suitable material 26 are arranged between the plates 10 and 11, although such material need not be used. When it is desired to unfasten or detach plate 10 from plate 11, it is only necessary to turn the element 12 by the use of a screw driver one-quarter of a revolution, which will disengage the element 12 from the connector 22. It is to be observed that the holes or apertures 18 are sufficiently large to allow the intermediate section of the connector 22 to clear the projection 17 either while engaging the element 12 with the connector 22 or while disengaging the same therefrom. The extremity of the shank 13 having the slots is well rounded in order to facilitate the entrance of the connector 22 in the branches 16.

I claim:

1. The combination with two parts to be fastened together, of a fastening device comprising a spring member secured to one of said parts and said part having an opening therein across which said member extends, and a button swivelly connected with the other of said parts and having a tubular end provided with bayonet slots opposite each other, the construction and arrangement being such that the button may be engaged with said spring member to fasten said parts together.

2. In a fastening device, the combination with a part to be fastened, of a button swivelly connected with said part, said button having a tubular end portion provided with bayonet slots opposite each other in the wall thereof positioned to receive a cooperative fastener, the entrance branches of said slots being spiral, and projections forming continuations of certain walls of the slots to resist retrograde rotation of said button.

3. A fastening comprising the combination with parts to be fastened together, one of said parts having an opening therein, of a fastening element consisting of an intermediate straight section, and coils formed respectively on the opposite ends of said straight section, means on the part having said opening engageable with said coils to secure the element on said part with the straight section disposed transversely of said opening, and turnable means carried by the other of said parts passing through said opening and engageable with said straight section by turning said last means to detachably fasten said parts together.

4. A fastening device comprising separate co-engaging fastening elements, one of said elements having means on its ends to attach it to a part to be fastened to a second part and by virtue of which it is resilient, the second of said elements being applied to said second part for turning movement by coacting means on said element and second part, and means on one end of said second element so formed as to have interlocking engagement with said resilient element by the turning movement of the former to detachably fasten said parts together.

5. A fastening device comprising separate co-engaging fastening elements, one of said elements being made of cross-sectionally round stock and having means on its ends to attach it to a part to be fastened to a second part and by virtue of which it is resilient, the second of said elements being applied to said second part for turning movement by coacting means on said element and second part, and means on one end of said second element so formed as to have interlocking engagement with said resilient element by the turning movement of the former, to detachably fasten said parts together.

6. A fastening device comprising separate co-engaging fastening elements, means securing one of said elements to a part to be fastened to a second part and including spring coils by virtue of which it is resilient; the second of said elements being applied to said second part for turning movement by coacting means on said element and second part, and means on one end of said second element so formed as to have interlocking engagement with said resilient element by the turning movement of the former, to detachably fasten said parts together.

7. A fastening device comprising co-engaging fastening elements, means securing one of said elements to a part to be fastened to a second part and including spring coils on the opposite ends thereof by virtue of which it is resilient; the second of said elements being applied to said second part for turning movement by coacting means on said element and second part, and means on one end of said second element so formed as to have interlocking engagement with said resilient element by the turning movement of the former, to detachably fasten said parts together.

8. A fastening device comprising separate co-engaging fastening elements, one of said elements having means on its ends to attach it to a part to be fastened to a second part and by virtue of which it is resilient, the second of said elements being applied to said second part for turning movement by coacting means on said element and second part, and one end of said second element so slotted as to have interlocking engagement with said resilient element by the turning movement of the former, to detachably fasten said parts together.

WILLIAM DZUS.